March 18, 1969 B. M. OLIVER 3,434,002

HORIZONTAL DEFLECTION CIRCUIT WITH MONITOR WINDING INDUCTIVELY COUPLED TO YOKE

Filed Oct. 5, 1966

INVENTOR
BERNARD M. OLIVER
BY Roland I. Griffin
ATTORNEY

INVENTOR
BERNARD M. OLIVER
BY Roland I. Griffin
ATTORNEY

INVENTOR
BERNARD M. OLIVER
BY Roland I. Griffin
ATTORNEY

INVENTOR
BERNARD M. OLIVER
BY Roland I. Griffin
ATTORNEY

United States Patent Office 3,434,002

Patented Mar. 18, 1969

3,434,002

HORIZONTAL DEFLECTION CIRCUIT WITH MONITOR WINDING INDUCTIVELY COUPLED TO YOKE

Bernard M. Oliver, Los Altos Hills, Calif., assignor to Hewlett-Packard Company, Palo Alto, Calif., a corporation of California Filed Oct. 5, 1966, Ser. No. 584,492

U.S. Cl. 315—27 25 Claims

Int. Cl. H01j *29/70*

ABSTRACT OF THE DISCLOSURE

A voltage source and a flyback capacitor shunted by a solid state switch for periodically short-circuiting the flyback capacitor are connected in series with a deflection yoke winding to provide an energy conserving sweep circuit. The voltage source and a monitoring winding are connected for driving an amplifier to feed back a correction voltage in series with the yoke winding when the voltages produced by the voltage source and the monitoring winding differ from a predetermined magnitude relationship. Two cascaded emitter-follower stages connected for signal transmission from the input of the first stage to the output of the second stage whenever the first stage is biased on at a quiescent operating current are employed in the amplifier. The monitoring winding is electrically detached from the voltage source by a diode during the flyback period to protect the amplifier from large voltages produced in the monitoring winding during the flyback period. A capacitor may be connected in shunt with this diode to increase the current in the yoke winding at the end of the flyback period and thereby compensate for losses in the yoke winding. Circuitry is provided for drawing an adjustable centering current through the yoke winding. The voltage source is provided with a capacitive output impedance that resonates with the yoke winding during the forward sweep period to distort the sweep waveform as required to correct for the nonlinearity of deflection that exists in some cathode ray picture tubes.

This invention relates generally to a system for producing in an inductor a current waveform that varies with time in a desired manner and in one specific aspect to an energy conserving deflection system for producing in the deflection yoke of a television receiver a sweep current waveform that varies with time in a desired manner.

The energy stored in the deflection yoke of a television receiver or picture monitor at the beginning and end of a sweep is typically on the order of one to three millijoules. If this energy is dissipated in the deflection system at the end of the forward sweep period and then restored at the end of the flyback period, an input power on the order of thirty to ninety watts is required. Such a high power requirement would make the driving aparatus more expensive. For this reason, television receivers customarily use energy conserving deflection systems in which the stored magnetic energy in the deflection yoke at the end of the forward sweep period is converted into stored electrical energy in a capacitor during the flyback period and returned to the deflection yoke as stored magnetic energy (but with reversed current) by the end of the flyback period. In such systems only the power dissipated by the losses in the deflection yoke and the switching circuits must be supplied, and this typically is on the order of only a few watts. However, such systems do not produce a linear sweep waveform because of the resistance associated with the switching circuits and the deflection yoke itself; they produce instead a sweep waveform that is a section of an exponential curve. Various distorting means are employed to correct for the nonlinearity of the sweep waveform, but the degree of linearity achieved leaves much to be desired. In addition, these deflection systems do not provide a conveniently adjustable range of sweep amplitudes while maintaining linearity. Thus the sweep amplitude must first be set, then the linearity adjusted, then the amplitude reset, and so on.

Accordingly, it is an object of this invention to provide an energy conserving solid state deflection system having high efficiency and a very high degree of linearity.

Another object of this invention is to provide a deflection system in which the adjustment of amplitude does not materially affect the linearity.

Still another object of this invention is to provide a deflection system in which the adjustment of picture centering affects neither the picture size nor the linearity to any great extent and in which all of these adjustments are substantially independent.

A further object of this invention is to provide a highly efficient deflection system in which a basically linear output sweep waveform can be given a predetermined amount of desirable odd-order curvature to correct for the nonlinearity of deflection that exists in cathode ray picture tubes in which the radius of curvature of the screen is greater than one and one-half times the distance between the center of deflection and the screen.

Still a further object of this invention is to provide a system for producing in an inductor a current waveform that varies with time in a desired manner.

It is also an object of this invention to provide a transistorized amplifier that may be used in a current waveform compensation circuit and that comprises a plurality of cascaded emitter-follower stages characterized by signal transmission from the input of the first stage to the output of the last stage whenever the intermediate stages are biased on at a quiescent operating current even though the last stage is biased off at this quiescent operating current.

These objects are accomplished in accordance with the illustrated embodiments of this invention by providing an energy conserving solid state deflection system comprising a deflection yoke winding, a flyback capacitor and a voltage source that are connected in series with the deflection yoke winding, and switching means for short-circuiting the flyback capacitor during the forward sweep period. A monitoring winding is coupled to the yoke winding to produce a voltage that is proportional to the rate of change of the sweep current in the yoke winding and that bears a predetermined magnitude relationship to the voltage of the voltage source when the sweep current varies with time in a desired manner during the forward sweep period. The monitoring winding and the voltage source are connected to the input of a transistorized amplifier for driving the amplifier to correct for undesired variations of the sweep current with time during the forward sweep period by supplying a compensating feedback voltage to one end of the yoke winding when the voltage of the monitoring winding and the voltage of the voltage source differ from the predetermined magnitude relationship. The transistorized amplifier includes a pair of cascaded emitter-follower stages and a circuit connecting the output of the first emitter-follower stage to the output of the second emitter-follower stage so as to provide signal transmission from the input of the first stage to the output of the second stage whenever the first stage is biased on at a quiescent operating current even through the second stage is biased off at this quiescent operating current. A diode is serially connected with the monitoring winding between the input of the amplifier and either a point of ground potential or the voltage source. This diode becomes nonconductive during the flyback period and electrically detaches the monitoring winding from the source of potential to which it is connected so as to protect the amplifier from the large voltages produced in the monitoring winding during the flyback period. A capacitor may be connected in shunt with the diode for driving the amplifier in a way that increases the current in the yoke winding at the end of the flyback period. This compensates for losses in the yoke winding and reduces the current drain on the voltage source. An inductor having an inductance substantially larger than the inductance of the yoke winding may be serially connected with a bypassed resistor between the other end of the yoke winding and a point of ground potential (or another power supply) so as to draw through the yoke winding a centering current that varies with the average voltage at the output of the amplifier (and of the other power supply, if one is used). A variable resistor may be connected in series with the monitoring winding and the input of the amplifier for varying the average output voltage of the amplifier so as to adjust the centering current flowing through the yoke winding without substantially altering the picture size or the linearity of the sweep current waveform. The voltage source for the deflection system may be provided, for the fundamental sweep frequency and all harmonics, with a capacitive output impedance that resonates with the deflection winding during the forward sweep period so as to distort the sweep waveform in a manner required to correct for the nonlinearity of deflection that exists in cathode ray picture tubes in which the radius of curvature of the screen is greater than one and one-half times the distance between the center of deflection and the screen.

Other and incidental objects of this invention will be apparent from a reading of this specification and an inspection of the accompanying drawing in which:

FIGURE 1 is a schematic representation of an idealized energy conserving deflection system;

FIGURES 2*a* and *b* are waveform diagrams illustrating the operation of the idealized deflection system of FIGURE 1;

FIGURE 3 is a circuit diagram showing a practical realization of the idealized deflection system of FIGURE 1;

FIGURES 4*a* and *b* are waveform diagrams illustrating the operation of the deflection system of FIGURE 3;

Figure 1:
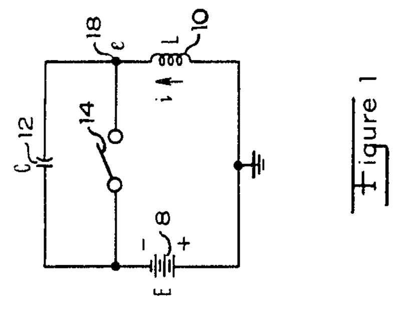
Figure 2:
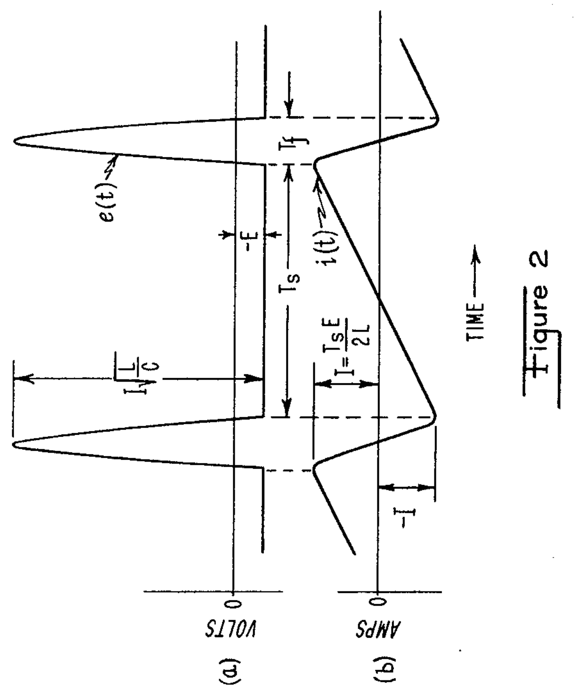

Referring to FIGURE 1, there is shown an idealized energy conserving deflection system comprising a voltage source 8 of fixed potential E with one end connected to ground, a yoke winding 10 having an inductance L and having one end connected to ground, a flyback capacitor 12 having a capacitance C and being connected between the ungrounded end of the voltage source 8 and the ungrounded end of the yoke winding 10 for resonating with the yoke winding during the flyback period, and a switch 14 for short-circuiting the flyback capacitor 12 during the forward sweep period. Inspection of FIGURE 2*a*, which represents the voltage *e* at the junction 18 between the yoke winding 10 and the flyback capacitor 12, and FIGURE 2*b*, which represents the current *i* in the yoke winding 10, shows that during the first half of the forward portion of the sweep when the switch 14 is closed the current *i* drawn from the voltage source 8 is in a direction opposite from that shown so as to deliver energy to the voltage source and so that at the center of the forward portion of the sweep there is no stored energy in the yoke winding 10, it having all been returned to the voltage source. During the second half of the forward portion of the sweep this energy is withdrawn from the voltage source 8 and stored in the yoke winding 10. At the end of the forward portion of the sweep a current *i* in the direction shown will have been established in the yoke winding 10. Switch 14 is then opened and the yoke winding and the flyback capacitor 12 describes a half cycle of their natural frequency of oscillation. In a time equal to a quarter period of the resonant frequency the voltage across the flyback capacitor 12 rises from its value of zero by an amount $I\sqrt{L/C}$ and concomitantly the current in the yoke winding 10 drops from its value of $T_sE/2L$ to a value of zero. After another quarter period of the resonant frequency the voltage across the flyback capacitor 12 again returns to zero and the current in the yoke winding 10 drops further to a value of $$-\frac{T_sE}{2L}$$

At this point switch 14 is reclosed initiating the forward portion of the next sweep. If there are no losses in the yoke winding 10, flyback capacitor 12, or switch 14, this circuit produces the ideal sweep current waveform $i(t)$ shown in FIGURE 2*b* and consumes no net energy from the voltage source 8.

Figure 3:
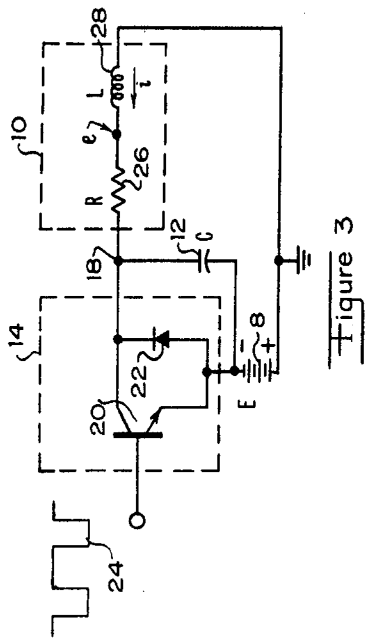

In practice the idealized energy conserving deflection system of FIGURE 1 may be realized as shown in FIGURE 3 where the switch 14 comprises the parallel combination of a transistor 20 and a diode 22. This parallel combination is connected between the junction point 18 and the power supply 8 so that the diode 22 conducts during the first half of the forward portion of the sweep when the current *i* flowing through the yoke winding 10 is in a direction opposite to that shown and so that the transistor 20 conducts during the latter half of the forward portion of the sweep when the current *i* is flowing in the direction shown. The flyback portion of the sweep is initiated by cutting off transistor 20 by applying a negative pulse 24 to its base as shown. This pulse 24 should have a duration longer than the flyback period. When the transistor 20 is cut off the voltage across the flyback capacitor 12 rises, as described above, to a peak value and then returns to zero. As soon as the voltage across the flyback capacitor 12 reverses by a very slight amount diode 22 conducts the current *i* which is now flowing in a direction opposite to that shown. At any later time before the center of the forward portion of the sweep, the transistor 20 may be turned back on so that it will be able to conduct when the current *i* reverses direction. For convenience the resistance R of the yoke winding 10 has been shown as a separate resistor 26 and the inductance L of the yoke winding 10 as a separate inductor 28. The voltage waveform $e(t)$ shown in FIGURE 4*a* is therefore the voltage produced by the inductor 28 only and is equal to $$L\frac{di}{dt}$$

At the beginning of the forward portion of the sweep the voltage across the inductor 28 is E plus the voltage drops across the resistor 26 and the diode 22, and at the end of the forward portion of the sweep the voltage across the inductor 28 is E minus the voltage drops across the resistor 26 and the transistor 20. Hence, as shown by the current waveform $i(t)$ in FIGURE 4*b*, the rate of change of current in the yoke winding 10 will be greater at the beginning of the forward portion of the sweep than at the end, and the current will reverse direction in the yoke winding at a time earlier than that corresponding to the true center of the forward portion of the sweep. If there were no voltage drops across the transistor 20 and the diode 22 but only the voltage drop across the resistor 26, the forward portion of the sweep would consist of a section of an exponential curve. The transistor 20 and the diode 22, however, produce a sudden step 30 in voltage (see FIGURE 4*a*) and therefore an abrupt change of sweep speed at the time the current $i$ reverses direction in the yoke winding 10.

Figure 4:
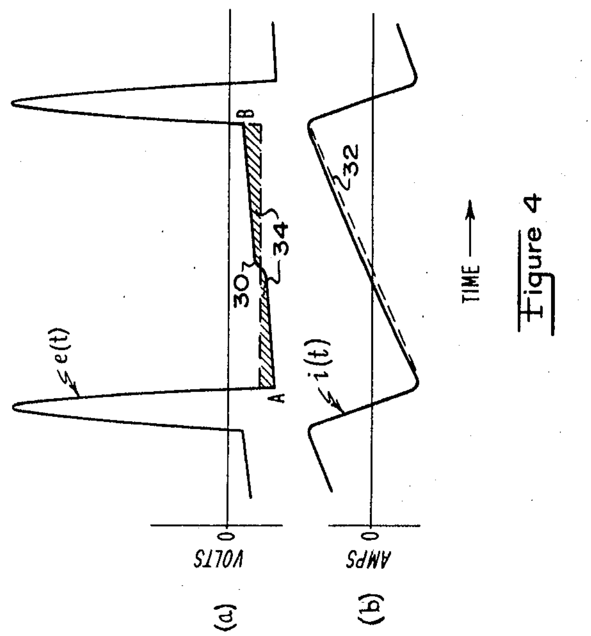
Figure 5:
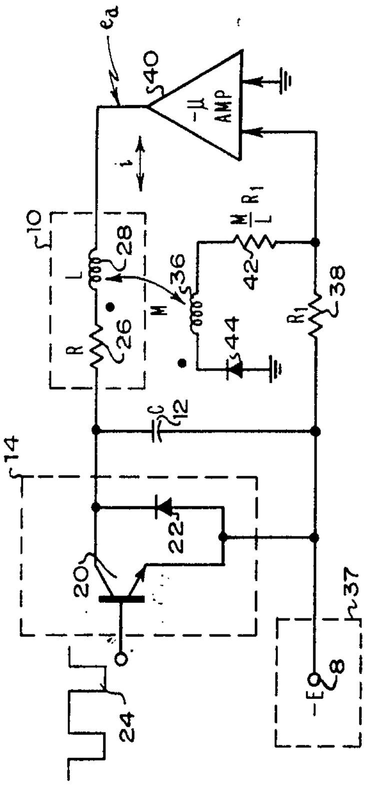
FIGURE 5 is a circuit diagram showing an energy conserving deflection system according to one embodiment of this invention.

In order to make the sweep current waveform $i(t)$ of FIGURE 4*b* linear, as indicated by the dashed line 32, it is necessary to add a voltage corresponding to the shaded area 34 shown in FIGURE 4*a* in series with the yoke winding 10. This would restore the voltage waveform $e(t)$ to the form shown in FIGURE 2*a*. Thus, the portion of $e(t)$ between the points labelled A and B in FIGURE 4*a* would again be constant and equal to —E. The circuit of FIGURE 5 illustrates one way of doing this in accordance with the principles of the present invention. A monitoring winding 36 is coupled to the yoke winding 10 so that a mutual inductance M exists between the two windings 10 and 36. The monitoring winding 36 provides a means of monitoring the sweep velocity and, hence, the linearity of the sweep current waveform since the voltage produced by the monitoring winding is at all times equal to $$M\frac{di}{dt}$$

A voltage source 37 for producing a reference voltage proportional to that produced by the monitoring winding 36 when the current in the yoke winding 10 varies linearly with the time during the forward sweep period is connected through a resistor 38 having a resistance $R_1$ to the input of a correction amplifier 40. This voltage source 37 may, as shown in FIGURE 5, comprise the source 8 of yoke winding supply voltage —E or it may comprise an independent source of reference voltage. The right end of the monitoring winding 36 is also connected to the input of the correction amplifier 40 through a resistor 42 having a resistance $$\frac{M}{L}R_1$$

Thus, no input voltage is supplied to the correction amplifier 40 when the voltage $$L\frac{di}{dt}$$

of the yoke winding 10 equals the voltage E of the voltage source 8. Any departure from this condition of voltage equality causes an input voltage to be supplied to the correction amplifier 40. The output of the correction amplifier 40 is connected to the end of the yoke winding 10 that was connected to ground in FIGURES 1 and 3. Assuming that the correction amplifier 40 produces an output voltage $e_a$ that is equal to $-\mu$ times its input voltage and that the correction amplifier has infinite input impedance and zero output impedance, it may be shown that this feedback structure has a loop gain of $$-\mu\frac{M}{L+M}$$

and that any undesired voltages in the yoke winding circuit such as the voltage drops across the resistor 26, the transistor 20, and the diode 22 are compensated for by changes in the output voltage $e_a$ of the correction amplifier 40, so that the effect of these undesired voltages is reduced by the factor $$\frac{1}{1+\mu\frac{M}{L+M}}$$

This factor may easily be made less than $1/100$ so that a 100:1 improvement in linearity is obtained. A diode 44 is connected between the other end of the monitoring winding 36 and ground so as to detach this other end of the monitoring winding from ground during the flyback period and thereby prevent the large voltages produced from this winding during this time from damaging the correction amplifier 40. The diode 44 also reduces the voltage between the yoke winding 10 and the monitoring winding 36 during the flyback period so that these two windings may be more intimately associated without fear of insulation breakdown. Although the forward resistance of diode 44 is non-linear, it does not distort the sweep waveform since the current through this diode during the forward sweep period is constant if the sweep waveform is linear.

Figure 6:
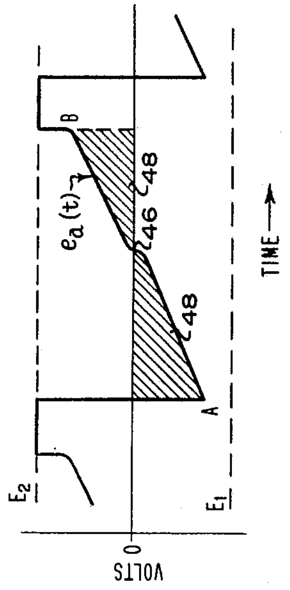
FIGURE 6 is a waveform diagram showing the output voltage of the amplifier of FIGURE 5.

FIGURE 6 shows the output voltage waveform $e_a(t)$ of the correction amplifier 40. During the flyback period the current drawn by resistor 38 is taken from the correction amplifier 40 thereby driving the correction amplifier into saturation at the positive voltage $E_2$. Immediately following the flyback period the output voltage $e_a(t)$ drops to a value less negative than $E_1$ and then rises to a positive value during the forward sweep period. If the yoke winding circuit contained only linear resistance, the portion of the output waveform between the points A and B would be a straight line. As it is, however, the voltage drop across the diode 22 and the transistor 20 changes suddenly at the time the current in the yoke winding 10 reverses direction thereby causing the correction amplifier 40 to supply a sudden step 46 in the voltage $e_a(t)$ at this time. The shaded area 48 shown in FIGURE 6 corresponds to the shaded area 34 shown in FIGURE 4*a* and its height at any time represents the additional voltage needed in the yoke winding circuit to produce a linear sweep current waveform.

Figure 7:
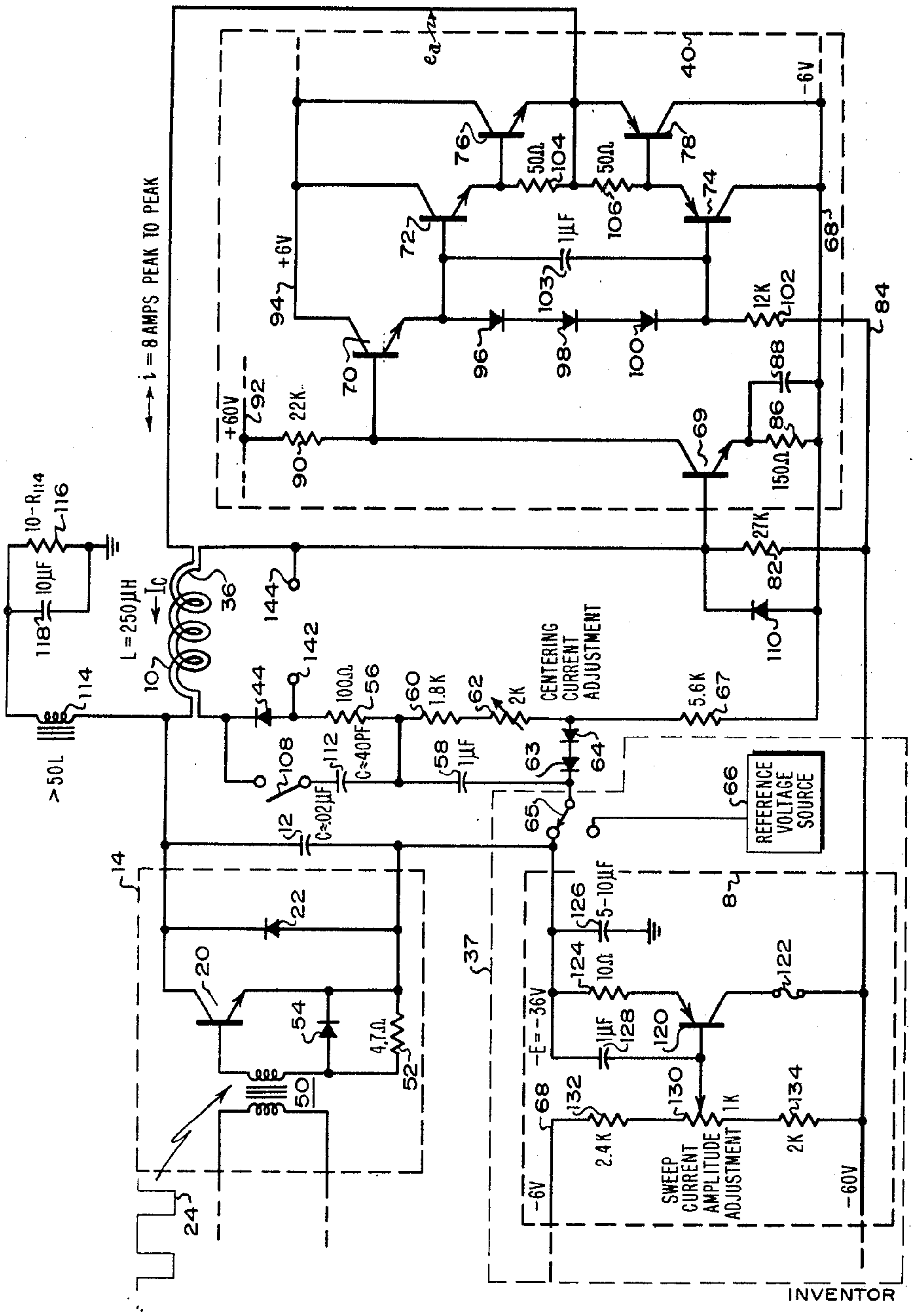
FIGURE 7 is a circuit diagram showing a practical energy conserving deflection system according to another embodiment of this invention.

Referring now to FIGURE 7, there is shown a practical embodiment of the invention comprising voltage source 8, yoke winding 10, flyback capacitor 12, switch 14, monitoring winding 36 and correction amplifier 40 as described above in connection with FIGURE 5. The transistor 20 of switch 14 has its emitter connected to its base through one winding of a transformer 50 and the parallel combination of a resistor 52 and a diode 54. Switching transistor 20 is driven through the transformer 50; this has the advantage of drawing no base current from the voltage source 8 that furnishes the sweep voltage for the yoke winding 10. The resistor 52 controls the forward base current in transistor 20 while the diode 54 permits transistor 20 to be abruptly switched off. The monitoring winding 36 is shown as having been wound bifilar with the yoke winding 10 so that for all practical purposes $M=L$. Thus, if the circuit configuration of FIGURE 5 were used the voltage of voltage source 37 and the monitored voltage $$L\frac{di}{dt}$$

would be combined by means of two equal resistors 38 and 42 to drive the correction amplifier 40. The six decibel loss in loop gain that would occur if these resistors 38 and 42 were used is avoided, as shown in FIGURE 7, by simply connecting the right end of the monitoring winding 36 directly to the input of the amplifier 40 and the left end of the monitoring winding 36 to the voltage source 37 through the diode 44, a fixed resistor 56, and at high frequencies a capacitor 58 or at low frequencies a fixed resistor 60, a variable resistor 62, and a pair of diodes 63 and 64. As indicated by the position of switch 65, voltage source 37 comprises the source 8 of yoke winding supply voltage —E; however, it may comprise an independent source 66 of reference voltage, as indicated by the alternate position of switch 65. The resistor 56 is connected in series with the diode 44 so as to damp out the ringing that would otherwise occur at the end of the flyback period when diode 44 becomes conductive. Diodes 63 and 64 pass forward current at all times as supplied by resistor 67 from a voltage source 68 of negative potential and are included to compensate for the variation with temperature in the voltage drop that occurs in transistor 69 and diode 44.

The correction amplifier 40 includes a stage of voltage gain provided by transistor 69 and three stages of current gain provided by transistors 70–78. A resistor 82 is connected from the base of transistor 69 to another source 84 of negative potential for drawing a current through variable resistor 62, fixed resistors 60 and 56, diode 44, and monitoring winding 36 to provide a biasing voltage for transistor 69. Transistor 69 has its emitter connected by the parallel combination of a resistor 86 and a capacitor 88 to the source 68 of negative potential and has its collector connected to the base of transistor 70 and connected through a load resistor 90 to a source 92 of positive potential. The transistor 70 has its collector connected to another source 94 of positive potential and has its emitter connected to the base of transistor 72 and connected through serially connected diodes 96–100 to the junction between the base of transistor 74 and one end of a resistor 102, the other end of which is connected to the source 84 of negative potential. A capacitor 103 is connected in shunt with the serially connected diodes 96–100 between the bases of transistors 72 and 74. Transistors 72–78 comprise a pair of cascaded class B emitter-follower stages in which the collectors of transistors 72 and 76 are connected to the source 94 of positive potential, the collectors of transistors 74 and 78 are connected to the source 68 of negative potential, and the emitters of transistors 72 and 74 are connected, respectively, to the bases of transistors 76 and 78 and are connected in common by serially connected resistors 104 and 106. A diode typically has about the same voltage drop when it is forward biased as does the base-emitter junction of a transistor made from the same type of semiconductor material. Since the number of serially connected diodes 96–100 is one greater than the number of of base-emitter junctions in the path including transistors 72 and 74 and resistors 104 and 106, but one less than the number of emitter-base junctions in the path including transistors 72 and 74 and transistors 76 and 78, transistors 72 and 74 are forward biased by diodes 96–100 so as to draw a small quiescent operating current through resistors 104 and 106 while transistors 76 and 78 are not. The midpoint of resistors 104 and 106 is connected in common with the emitters of transistors 76 and 78 to the output of the correction amplifier 40 so as to provide signal transmission to the output of the correction amplifier even though transistors 76 and 78 are normally cut off at this quiescent operating current. The output of the correction amplifier 40 is connected to the right end of the yoke winding 10.

Figure 8:
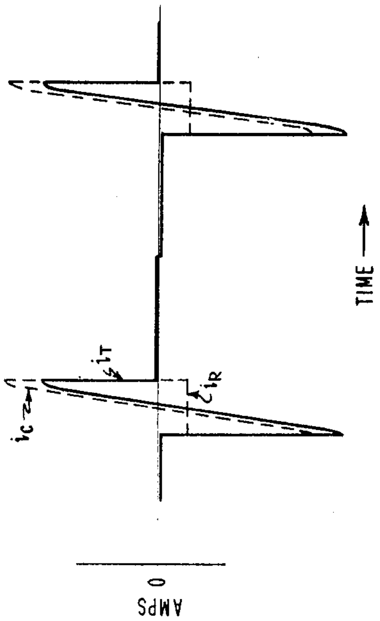
FIGURES 8–13 are waveform diagrams illustrating the operation of the deflection system of FIGURE 7.
Figure 9:
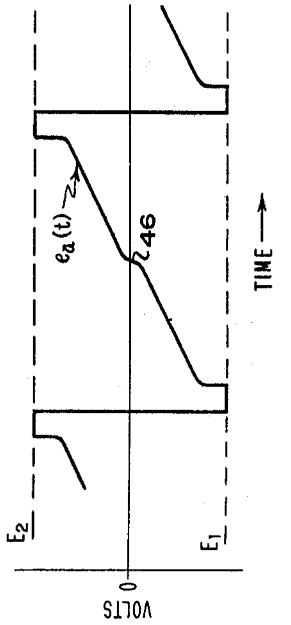

When the switch 108 is open, as shown in FIGURE 7, the waveform out of the correction amplifier 40 is as shown in FIGURE 6 with $E_2$ corresponding substantially to the positive potential of source 94 and $E_1$ corresponding substantially to the negative potential of source 68. A diode 110 is connected between the base of transistor 69 and the source 68 of negative potential so that during the flyback period when diode 44 is nonconductive the resistor 82 that is connected between the base of transistor 69 and the source 84 of negative potential draws a current of about two milliamperes through the diode 110 to hold the transistor 69 cutoff. This current is shown as the waveform $i_R$ in FIGURE 8. When the switch 108 is closed so as to connect a capacitor 112 in shunt with both diode 44 and resistor 56, the charging current for capacitor 112 during the flyback period causes an additional current shown as the waveform $i_C$ in FIGURE 8 to be drawn from diode 110 or transistor 69, or from the stray capacitance between the yoke winding 10 and the monitoring winding 36. Thus, the total current that has to be supplied by the diode 110 or the transistor 69, or by this stray capacitance, is the sum of $i_C$ and $i_R$ and is shown as the solid waveform $i_T$ in FIGURE 8. This current reverses direction near the middle of the flyback period. If the capacitance between the yoke winding 10 and the monitoring winding 36 is not too great, this reversal of current causes transistor 69 to be saturated shortly after the middle of the flyback period. The correction amplifier 40 then produces an output waveform $e_a(t)$ as shown in FIGURE 9. A step in voltage equal to $E_2-E_1$ is therefore applied to the yoke winding 10 close to the middle of the flyback period so that at the end of the flyback period (one-quarter cycle later) a resulting current almost equal to $$\frac{E_2-E_1}{\sqrt{L/C}}$$

is established in the yoke winding 10. This current is in a direction to increase the current in the yoke winding 10 at the end of the flyback period thereby helping to compensate for the losses in the yoke winding during the flyback period and to reduce the current drain from the voltage source 8. Although there is always some stray capacitance to ground, additional capacitance provided by connecting capacitor 112 in shunt with diode 44 will normally be required to obtain the above-described action.

A D-C centering current $I_c$ ise made to flow through the yoke winding 10 by connecting one end of a large inductor 114 to the left end of the yoke winding 10 and the other end of the large inductor 114 to ground through a small resistor 116 that is shunted by a bypass capacitor 118. The inductor 114 should have an inductance of, for example, more than fifty times the inductance of the yoke winding 10 so that negligible sweep current is shunted by inductor 114. Since there can be no D-C voltage drop across an inductor, the centering current $I_c$ that flows in the yoke winding 10 is given by the average value of the output voltage $e_a$ of correction amplifier 40 divided by the total resistance of the yoke winding 10 and the additional resistance to ground through inductor 114 and bypassed resistor 116. The average value of the correction amplifier output voltage $e_a$ is adjusted by varying the variable resistor 62 in the biasing circuit of transistor 69. So long as the output voltage $e_a$ remains within the saturation limits $E_1$ and $E_2$ of the correction amplifier 40 at all times during the forward sweep period, this adjustment will not affect linearity, and so long as the change in the average value of $e_a$ is small compared with the voltage E of voltage source 8, the effect on picture size will be small. In order that this adjustment not be too critical, that is, in order that small changes in the average output voltage supplied by the correction amplifier 40 not produce large centering currents, the resistance of resistor 116 is selected to make the total resistance of inductor 114 ($R_{114}$) and resistor 116 on the order of a few ohms. Resistor 116 is bypassed in order that the small amount of sweep current diverted by inductor 114 not produce additional losses.

Figure 11:
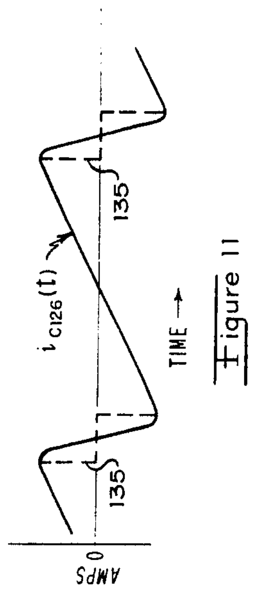
Figure 10:
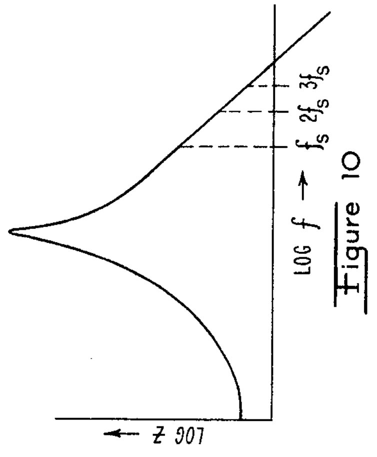
Figure 12:
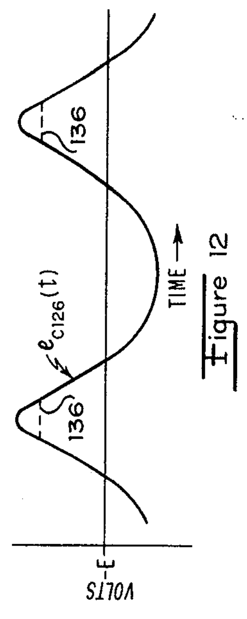

The voltage source 8 comprises a transistor 120 having its collector connected through a fuse 122 to the source 84 of negative potential and its emitter connected through a resistor 124 to one end of a large capacitor 126 the other end of which is connected to ground. Transistor 120 has its base connected through a capacitor 128 to the junction between the resistor 124 and the capacitor 126 and connected to the adjustable tap of a potentiometer 130 for controlling the voltage −E and hence the sweep current amplitude. One end of the resistive element of the potentiometer 130 is connected through a resistor 132 to the source 68 of negative potential and the other end of this resistive element is connected through a resistor 134 to the source 84 of negative potential. The large sweep currents passed by switching transistor 20 and switching diode 22 are drawn principally from the large capacitor 126. The steady current required to supply the losses inherent in the deffection system is provided by the emitter-follower transistor 120. If the resistor 124 in the emitter circuit of transistor 120 were shorted out, and if the capacitor 128 that bypasses the base of transistor 120 to the capacitor 126 were omitted, transistor 120 would have a low output impedance at all frequencies. By including the resistor 124 and the capacitor 128, however, the output impedance of the combination although remaining at a low value at D-C, becomes inductive at a relatively low frequency and thereafter rises with frequency. At some frequency $f$, which may be made a tenth of the sweep frequency $f_s$, this inductive output impedance resonates the capacitor 126 as shown in FIGURE 10. For high frequencies, that is for the fundamental sweep frequency and all harmonics, the impedance Z of the parallel combination of capacitor 126 and this inductive output impedance is essentially capacitive and equal to the reactance of capacitor 126. FIGURE 11 shows the waveform of the current $i_{c126}$ drawn from the capacitor 126; it is essentially the sweep current in the yoke winding 10 itself. If the flyback capacitor 12 were connected to ground rather than to capacitor 126, the current $i_{c126}$ would abruptly drop to zero and remain there during the flyback period as shown by the dashed lines 135 in FIGURE 11. As a result of the current flowing in capacitor 126 the voltage $e_{c126}$ across capacitor 126 varies as shown in FIGURE 12. If the sweep were exactly linear, the voltage across the capacitor 126 would consist of a parabola during the forward sweep period. With the flyback capacitor 12 connected as shown in FIGURE 7 the voltage across the capacitor 126 during the flyback period consists of a half cycle of a sine wave that connects smoothly with this parabola. If, however, the flyback capacitor 12 were connected to ground, the voltage across the capacitor 126 would remain constant during the flyback period as shown by the dashed lines 136 in FIGURE 12.

Figure 13:
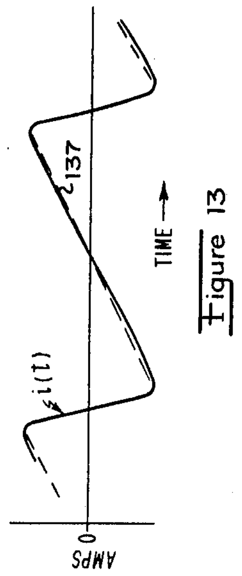
Figure 14:
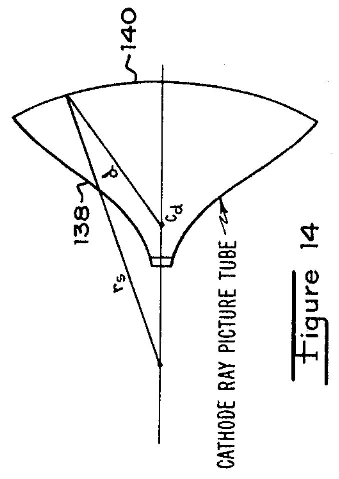
FIGURE 14 is a schematic representation of a cathode ray picture tube in which the radius of curvature of the screen is greater than one and one-half times the distance between the center of deflection and the screen.

The sweep velocity is directly proportional to the voltage on the capacitor 126. During the middle of the forward portion of the sweep this voltage is most negative; thus, the sweep velocity is highest at the middle of the forward portion of the sweep, as shown in FIGURE 13, so that the forward portion of the sweep current waveform $i(t)$ deviates from linearity as indicated with the aid of the dashed line 137. This S-shaped distortion of the sweep current waveform $i(t)$ is of the type needed to correct for the expansion of deflection that occurs at large deflection angles in cathode ray picture tubes 138 where, as shown in FIGURE 14, the radius of curvature $r_s$ of the screen 140 is greater than one and one-half times the distance $d$ between the center of deflection $c_d$ and the screen 140. The amount of this desired nonlinearity can be controlled by adjusting the value of capacitor 126. Since this nonlinearity will not change with time, capacitor 126 is chosen at the outset to match the combination of the yoke winding 10 and the cathode ray picture tube 138 being used. With the slight nonlinearity present in the sweep current waveform $i(t)$ of FIGURE 13, the voltage waveform $e_{c126}(t)$ of FIGURE 12 does not in fact consist of a parabola during the forward sweep period. What actually is happening is that during the forward portion of the sweep the yoke winding 10 is resonating with the capacitor 126 so that during the forward sweep period the voltage $e_{c126}(t)$ consists of a short section of a very-long-period sine wave, while during the flyback portion of the sweep the yoke winding 10 is resonating with the series combination of capacitors 12 and 126 so that during the flyback period the voltage waveform $e_{c126}(t)$ consists of an inverted half cycle of a shorter-period sine wave.

The linearity obtained with this deflection system can be measured by connecting a differential oscilloscope to the test points 142 and 144. During the flyback period, diode 44 prevents large voltages from being applied to the oscilloscope; hence, there is no overload problem in the oscilloscope. During the forward portion of the sweep the voltage $$L\frac{di}{dt}$$

which is a direct measure of sweep velocity, is applied to the oscilloscope. The measurement thus obtained will include any nonlinearity introduced to correct for deflection expansion. By measuring the voltage from test point 144 to ground, only the departure in sweep velocity from the desired sweep waveform is obtained. In an actual trial so measured sweep linearities of better than 0.2% have been obtained.

Figure 15:
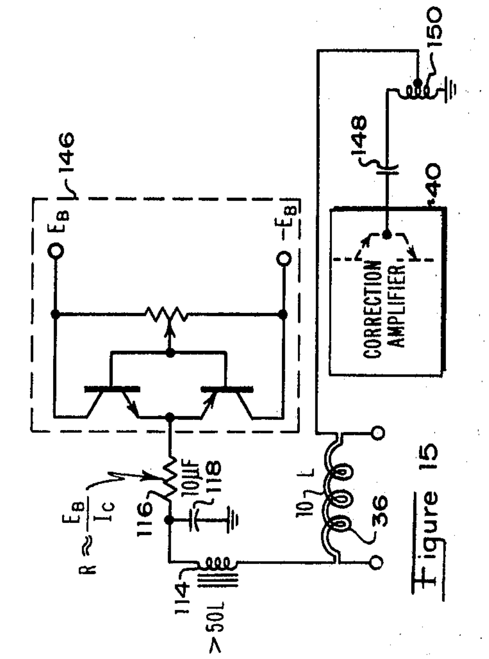
FIGURE 15 is a circuit diagram showing modifications of the energy conserving deflection system of FIGURE 7 according to still another embodiment of this invention.

It is apparent that many modifications of this system can be made without departing from the principles of the invention herein embodied. For example, the switch 14 and the flyback capacitor 12 may be transferred to the other side of the yoke winding 10. The diode 44 and capacitor 112 would then also be transferred to the other side of the yoke winding 10. This modification of the system may be preferred if the centering current feature of the system is not used. If low voltage power supplies symmetrical about ground are not available, the correction amplifier 40 can be connected between ground and a single low voltage power supply; a corresponding change is then required in the yoke winding supply voltage —E to compensate for the new average value of the correction amplifier output voltage $e_a$. In this case, unless an appropriate supply of half voltage is available, it is no longer possible to use the simple centering method shown in FIGURE 7, but an additional centering supply 146, as shown in FIGURE 15, can be added. If the output voltage swing required from the correction amplifier 40 is considerably lower than the lowest low-voltage power supply available, it is possible to couple the correction amplifier 40 to the yoke winding 10 through a blocking capacitor 148 and an autotransformer 150 as also shown in FIGURE 15. This arrangement simply matches the voltage swing required to that capable of being furnished by the correction amplifier 40 and reduces the current and power requirements of the correction amplifier by the turns ratio of the autotransformer 150. However, if a blocking capacitor 148 is used between the correction amplifier 40 and the autotransformer 150, the correction amplifier can no longer cause an increase or decrease in the average value of $$L\frac{di}{dt}$$

during the sweep and so is not able to dynamically center itself in the middle of its output voltage range. As a result the correction amplifier 40 must either be A-C coupled or have a separate D-C feedback path provided to assure D-C stability. If the blocking capacitor 148 is inserted in series with the grounded end of the autotransformer 150 D-C transmission to the yoke winding 10 is re-established, but a zero of transmission is introduced at the frequency at which the series capacitor 148 resonates with the inductance of the lower half of the autotransformer winding plus the mutual inductance between the two halves. Appropriate damping may then be needed to avoid Nyquist instability.

I claim:

1. A system for producing in a first inductor a repetitive current waveform that varies with time in a desired manner during a first portion of the current cycle and returns it to its initial value during a second portion of the current cycle, said system comprising:

a circuit forming a first current conduction path including said first inductor, a voltage source, and first switching means for conductively completing the first current conduction path during the first portion of the current cycle and for conductively interrupting the first current conduction path during the second portion of the current cycle, said circuit forming a second current conduction path including said first inductor and a capacitance for resonating with the first inductor during the second portion of the current cycle when said first current conduction path is interrupted by said first switching means;

a second inductor coupled to said first current conduction path for monitoring the variation with time of the current in the first current conduction path during the first portion of the current cycle and for producing a monitor signal related to the variation with time of this current;

a reference signal source for producing a reference signal, said reference signal being proportional to the monitor signal that is produced by said second inductor when during the first portion of the current cycle the current in said first current conduction path varies with time in the desired manner;

an amplifier having an input and an output;

first circuit means connecting said reference signal source and said second inductor to the input of said amplifier for combining the reference signal and the monitor signal to supply an input signal to the amplifier when the monitor signal is not proportional to the reference signal, said first circuit means including second switching means for conductively disconnecting said second inductor from the input of said amplifier during the second portion of the current cycle and including a capacitor connected in shunt with said second switching means so as to cause an abrupt change in the output signal of said amplifier during the second portion of the current cycle; and second circuit means coupling the output of said amplifier to said first current conduction path for supplying an output signal from the amplifier to the first current conduction path when the monitor signal is not proportional to the reference signal so as to modify the current in the first current conduction path to vary with time in the desired manner during the first portion of the current cycle.

2. A system as in claim 1 wherein said voltage source is also said reference signal source.

3. A system for producing in an inductor a repetitive current waveform that varies with time in a desired manner during a first portion of the current cycle and returns to its initial value during a second portion of the current cycle, said system comprising:

a circuit including said inductor and forming during the first portion of the current cycle a first current conduction path including said inductor and during the second portion of the current cycle a second current conduction path including said inductor;

monitorin gmeans coupled to said circuit for producing a monitor signal related to the variation with time of the current in the first current conduction path during the first portion of the current cycle;

a reference signal source for producing a reference signal proportional to the monitor signal produced by said monitoring means when during the first portion of the current cycle the current in said first current conduction path varies with time in the desired manner;

an amplifier having an input and an output;

first circuit means connecting said reference signal source and said monitoring means to the input of said amplifier for combining the reference signal and the monitor signal to supply an input signal to the amplifier when the monitor signal is not proportional to the reference signal, said first circuit means including switching means for conductively disconnecting said monitoring means from the input of said amplifier during the second portion of the current cycle and including a capacitor connected in shunt with said switching means so as to cause an abrupt change in the output signal of said amplifier during the second portion of the current cycle; and second circuit means coupling the output of said amplifier to said first current conduction path for supplying an output signal from the amplifier to the first current conduction path so as to modify the current in the first current conduction path to vary with time in the desired manner during the first portion of the current cycle.

4. A system for producing in an inductor a repetitive current waveform that varies with time in a desired manner during a first portion of the current cycle and returns to its initial value during a second portion of the current cycle, said system comprising:

a circuit including said inductor and forming during the first portion of the current cycle a first current conduction path including said inductor and during the second portion of the current cycle a second current conduction path including said inductor;

monitoring means coupled to said circuit for producing a monitor signal related to the variation with time of the current in the first current conduction path during the first portion of the current cycle;

a reference signal source for producin ga reference signal proportional to the monitor signal produced by said monitoring means when during the first portion of the current cycle the current in said first current conduction path varies with time in the desired manner;

an amplifier having an input and an output;

first circuit means connecting said reference signal source and said monitoring means to the input of said amplifier for combining the reference signal and the monitor signal to supply an input signal to the amplifier when the monitor signal is not proportional to the reference signal; and second circuit means coupling the output of said amplifier to said first current conduction path for supplying an output signal from the amplifier to the first current conduction path so as to modify the current in the first current conduction path to vary with time in the desired manner during the first portion of the current cycle, said second circuit means including an autotransformer and a blocking capacitor serially connected between the output of said amplifier and a source of reference potential, said autotransformer having a tap connected to said first current conduction path.

5. A system for producing in an inductor a repetitive current waveform that varies with time in a desired manner during a first portion of the current cycle and returns to its initial value during a second portion of the current cycle, said system comprising:

a circuit including said inductor and forming during the first portion of the current cycle a first current conduction path including said inductor and during the second portion of the current cycle a second current conduction path including said inductor;

monitoring means coupled to said circuit for producing a monitor signal related to the variation with time of the current in the first current conduction path during the first portion of the current cycle;

a reference signal source for producing a reference signal proportional to the monitor signal produced by said monitoring means when during the first portion of the current cycle the current in said first current conduction path varies with time in the desired manner;

an amplifier having an input, an output, and a plurality of transistorized emitter-follower stages connected in cascade between its input and its output with all but the last one of said stages being biased to conduct a quiescent operating current, said amplifier further including means connecting the output of the penultimate stage to the output of the amplifier for providing signal transmission to the output of the amplifier for a range of signals around the quiescent operating point of the conducting stages, although the last stage may be biased off within this range of signals;

first circuit means connecting said reference signal source and said monitoring means to the input of said amplifier for combining the reference signal and the minotor signal to supply an input signal to the amplifier when the monitor signal is not proportional to the reference signal; and second circuit means coupling the output of said amplifier to said first current conduction path for supplying an output signal from the amplifier to the first current conduction path so as to modify the current in the first current conduction path to vary with time in the desired manner during the first portion of the current cycle.

6. A system for producing in a first inductor a repetitive current waveform that varies with time in a desired manner during a first portion of the current cycle and returns to its initial value during a second portion of the current cycle, said system comprising:

a circuit including said first inductor and forming during the first portion of the current cycle a first current conduction path including the first inductor and during the second portion of the current cycle a second current conduction path including the first inductor;

monitoring means coupled to said circuit for producing a monitor signal related to the variation with time of the current in the first current conduction path during the first portion of the current cycle;

a reference signal source for producing a reference signal proportional to the monitor signal produced by said monitoring means when during the first portion of the current cycle the current in said first current conduction path varies with time in the desired manner;

an amplifier having an input and an output;

first circuit means connecting said reference signal source and said monitoring means to the input of said amplifier for combining the reference signal and the monitor signal to supply an input signal to the amplifier when the monitor signal is not proportional to the reference signal;

second circuit means coupling the output of said amplifier to said first current conduction path for supplying an output signal from the amplifier to the first current conduction path so as to modify the current in the first current conduction path to vary with time in the desired manner during the first portion of the current cycle;

an inductive element having an inductance substantially larger than the inductance of said first inductor;

means serially connecting said inductive element between one end of said first inductor and a source of potential; and means included within said first circuit means for adjusting the average output potential of said amplifier, whereby a substantially constant component of current proportional to the difference between the average output potential of the amplifier and the potential of said source of potential may be made to flow in said first inductor.

7. A system as in claim 6 wherein said source of potential is variable so that the substantially constant component of current flowing in said first inductor may be changed without varying the average output potential of said amplifier.

8. A system for producing in a first inductor a repetitive current waveform that varies with time in a desired manner during a first portion of the current cycle and returns to its initial value during a second portion of the current cycle, said system comprising:

a circuit forming during the first portion of the current cycle a first current conduction path including the first inductor and switching means for conductively completing the first current conduction path during the first portion of the current cycle and interrupting the first current conduction path during the second portion of the current cycle, said circuit forming during the second portion of the current cycle a second current conduction path including the first inductor and a capacitor for resonating with the first inductor during the second portion of the current cycle when the first current conduction path is interrupted by said switching means;

monitoring means coupled to said circuit for producing a monitor signal related to the variation with time of the current in the first current conduction path during the first portion of the current cycle;

a voltage source for producing a reference signal proportional to the monitor signal produced by said monitoring means when during the first portion of the current cycle the current in said first current conduction path varies with time in the desired manner, said voltage source being included together with said first inductor and said switching means in said first current conduction path;

an amplifier having an input and an output;

first circuit means connecting said voltage source and said monitoring means to the input of said amplifier for combining the reference signal and the monitor signal to supply an input signal to the amplifier when the monitor signal is not proportional to the reference signal; and second circuit means coupling the output of said amplifier to said first current conduction path for supplying an output signal from the amplifier to the first current conduction path so as to modify the current in the first current conduction path to vary with time in the desired manner during the first portion of the current cycle.

9. A system as in claim 8 wherein:

said monitoring means is an inductive element mutually coupled to said first current conduction path; and said voltage source presents a capacitive source impedance to all significant A-C components of the desired current waveform in said first inductor.

10. A system as in claim 9 wherein said voltage source comprises:

an impedance including at least one of a resistive device and an inductor, said impedance being connected at one end to a source of reference potential and being connected at the other end to said switching means and to said capacitor; and another capacitor connected between said other end of said impedance and a source of reference potential.

11. A system as in claim 10 wherein said impedance comprises the output impedance of an emitter-follower transistor stage, said transistor stage including an output terminal connected to said switching means and to said first-mentioned capacitor, means for connecting the emitter of the transistor stage to said output terminal, a capacitor coupling the base of the transistor stage to said output terminal, and means for coupling the base of the transistor stage to a virtual source of D-C potential.

12. A system as in claim 8 wherein:

said monitoring means is a second inductor inductively coupled to said first inductor; and said voltage source presents a capacitive source impedance to all significant A-C components of the desired current waveform in said first inductor.

13. A system as in claim 12 wherein said voltage source comprises:

an impedance including at least one of a resistive device and an inductor, said impedance being connected at one end to a source of reference potential and being connected at the other end to said switching means and to said capacitor; and another capacitor connected between said other end of said impedance and a source of reference potential.

14. A system as in claim 13 wherein said impedance comprises the output impedance of an emitter-follower transistor stage, said transistor stage including an output terminal connected to said switching means and to said first-mentioned capacitor, means for connecting the emitter of the transistor stage to said output terminal, a capacitor for coupling the base of the transistor stage to said output terminal, and means for coupling the base of the transistor stage to a virtual source of D-C potential.

15. A solid state amplifier having an input and an output, said amplifier comprising:

a plurality of transistorized emitter-follower stages connected in cascade between the input and the output of the amplifier, each of said stages having an input and an output;

bias means including a number of diodes serially connected across the input of the first stage for biasing all but the last stage to conduct a quiescent operating current, said diodes being less in number than the transistors included in said emitter-follower stages; and circuit means including a pair of similar resistors connected across the output of the penultimate stage, the junction between said resistors being connected in common with the output of the last stage to the output of the amplifier for providing signal transmission to the output of the amplifier for a range of signals around the quiescent operating point of the conducting stages even though the last stage may be biased off within this range of signals.

16. A system for producing in an inductor a repetitive current waveform that varies with time in a desired manner during a first portion of the current cycle and returns to its initial value during a second portion of the current cycle, said system comprising:

a first current conduction circuit including said inductor, a capacitive impedance to all significant A-C components of the desired current waveform in said inductor, and switching means for conductively connecting the capacitive impedance to said inductor to resonate therewith during the first portion of the current cycle and for interrupting the first current conduction circuit during the second portion of the current cycle; and a second current conduction circuit including said inductor and another capacitive impedance to resonate therewith during the second portion of the current cycle when said first current conduction circuit is interrupted by said switching means;

each of said capacitive impedances including a capacitor shunting the output impedance of an emitter-follower transistor stage, said transistor stage including an output terminal, means for connecting the emitter of the transistor stage to said output terminal, a capacitor coupling the baes of the transistor stage to said output terminal, and means for coupling the base of the transistor stage to a virtual source of D-C potential.

17. A system for producing in a first inductor a repetitive current waveform that varies with time in a predetermined manner during a first portion of the current cycle and returns to its initial value during a second portion of the current cycle, said system comprising:

a circuit forming a first current conduction path including a voltage source, the first inductor, and switching means connected between the voltage source and one end of the first inductor for electrically completing the first current conduction path during the first portion of the current cycle and for electrically interrupting the first current conduction path during the second portion of the current cycle, said circuit forming a second current conduction path including the first inductor and a capacitor connected across the switching means and between the voltage source and said one end of the first inductor for resonating with the first inductor during the second portion of the current cycle when the first current conduction path is electrically interrupted by the switching means;

monitoring means coupled to said first current conduction path for producing a monitor signal related to the variation with time of the current in the first current conduction path during the first portion of the current cycle;

a reference signal source for producing a reference signal proportional to the monitor signal produced by said monitoring means when during the first portion of the current cycle the current in said first current conduction path varies with time in the predetermined manner;

an amplifier having an input and an output;

first circuit means connecting said reference signal source and said monitoring means to the input of said amplifier for combining the reference signal and the monitor signal to cause the amplifier to supply a correction signal at its output when the monitor signal is not proportional to the reference signal; and second circuit means connecting the output of said amplifier to the other end of the first inductor for supplying the correction signal from the amplifier to the first current conduction path to modify the current in the first inductor to vary with time in the predetermined manner during the first portion of the current cycle.

18. A system as in claim 17 wherein said monitoring means is an inductive element mutually coupled to said first current conduction path.

19. A system as in claim 17 wherein said monitoring means is a second inductor inductively coupled to said first inductor.

20. A system as in claim 19 wherein said first circuit means includes switching means for electrically disconnecting said monitoring means from the input of said amplifier during the second portion of the current cycle.

21. A system as in claim 17 wherein said voltage source is also said reference signal source.

22. A solid state amplifier having an input and an output, said amplifier comprising:

a plurality of symmetrical, transistorized emitter-follower stages connected in cascade between the input and the output of the amplifier, each of said stages having a pair of input base electrodes and a pair of output emitter electrodes;

bias means connected between the input base electrodes of the first stage for biasing all but the last stage to conduct a quiescent operating current; and circuit means connecting the output emitter electrodes of the penultimate stage in common with the output emitter electrodes of the last stage to the output of the amplifier for providing signal transmission to the output of the amplifier for a range of signals around the quiescent operating point of the conducting stages even though the last stage may be biased off within this range of signals.

23. A solid state amplifier as in claim 22 wherein:

said bias means includes a plurality of diodes serially connected between the input base electrodes of the first stage; and said circuit means includes a pair of similar resistors serially connected between the output of the penultimate stage, the junction between said resistors being connected in common with the output of the last stage to the output of the amplifier.

24. A system for producing in an inductor a repetitive current waveform that varies with time in a desired manner during a first portion of the current cycle and returns to its initial value during a second portion of the current cycle, said system comprising:

a capacitive impedance to all significant A-C components of the desired current waveform in said inductor, said capacitive impedance including a first capacitor;

a second capacitor serially connected with the first capacitor between the inductor and a source of reference potential;

a first current conduction path including the inductor, the first capacitor, and switching means connected across the second capacitor and between the inductor and the first capacitor for electrically completing the first current conduction path during the first portion of the current cycle and for electrically interrupting the first current conduction path during the second portion of the current cycle, whereby the inductor resonates with the first capacitor during the first portion of the current cycle; and a second current conduction path including the inductor, the first capacitor, and the second capacitor, whereby the inductor resonates with the series combination of the first and second capacitors during the second portion of the current cycle when the first current conduction path is interrupted by the switching means.

25. A system as in claim 24 wherein the first-mentioned capacitive impedance further includes an emitter-follower transistor stage comprising an output terminal connected to a point between the first and second capacitors, means for connecting the emitter of the transistor stage to the output terminal, a capacitor coupling the base of the transistor stage to the output terminal, and means for coupling the base of the transistor stage to a virtual source of D-C potential.

References Cited

UNITED STATES PATENTS

| | | | |
|---|---|---|---|
| 2,077,574 | 4/1937 | Maloff | 315—27 |
| 2,521,741 | 9/1950 | Parker | 315—27 |
| 2,654,855 | 10/1953 | Denton | 315—27 |
| 3,179,843 | 4/1965 | Schwartz | 315—27 |

OTHER REFERENCES

Marvin B. Herscher: Designing Transistor A-F Power Amplifiers, April 1958, pp. 96–99.

RODNEY D. BENNETT, Jr., *Primary Examiner.*

J. G. BAXTER, *Assistant Examiner.*

U.S. Cl. X.R.

330—13, 19, 22

UNITED STATES PATENT OFFICE
CERTIFICATE OF CORRECTION

Patent No. 3,434,002

March 18, 1969

Bernard M. Oliver

It is certified that error appears in the above identified patent and that said Letters Patent are hereby corrected as shown below:

Column 2, line 68, "through" should read -- though --. Column 4, line 13, after "winding" insert -- 10 --; line 14, "describes" should read -- describe --. Column 8, line 24, "ise" should read -- is --. Column 9, line 39, after "sweep" insert -- and lower at both ends of the forward portion of the sweep --. Column 11, line 46, "monitorin gmeans" should read -- monitoring means --. Column 12, line 17, "producin ga" should read -- producing a --. Column 13, line 2, "minotor" should read -- monitor --. Column 15, line 51, "baes" should read -- base --.

Signed and sealed this 31st day of March 1970.

(SEAL)
Attest:

Edward M. Fletcher, Jr.
Attesting Officer

WILLIAM E. SCHUYLER, JR.
Commissioner of Patents